June 27, 1967 W. G. JEAKLE 3,327,561
DIFFERENTIAL MECHANISM
Filed July 29, 1965
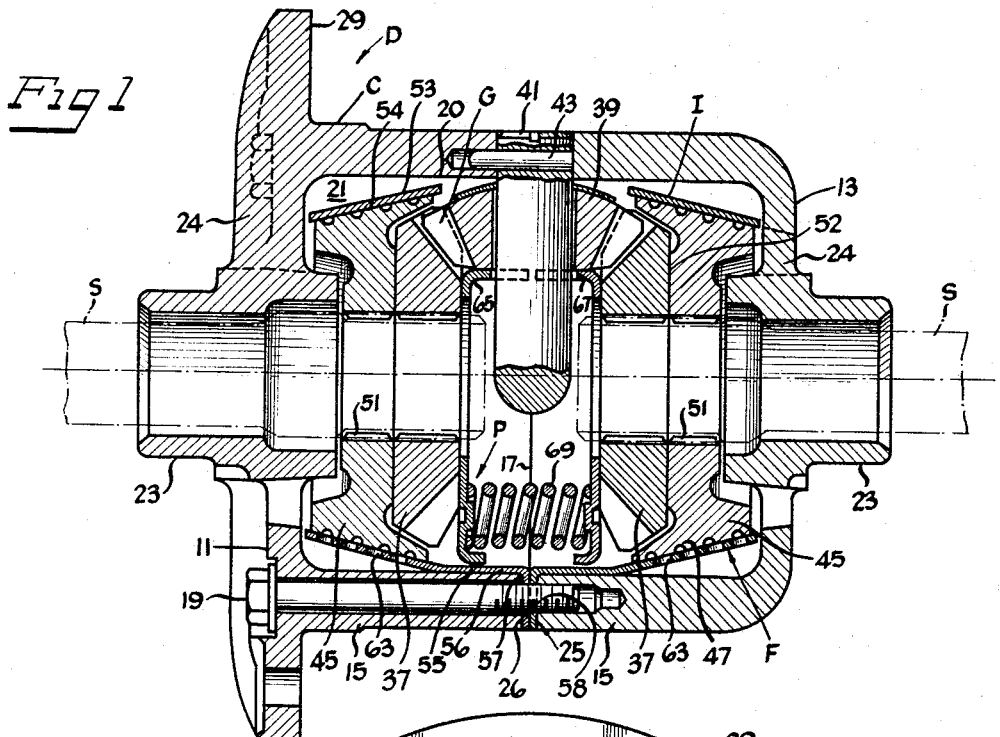
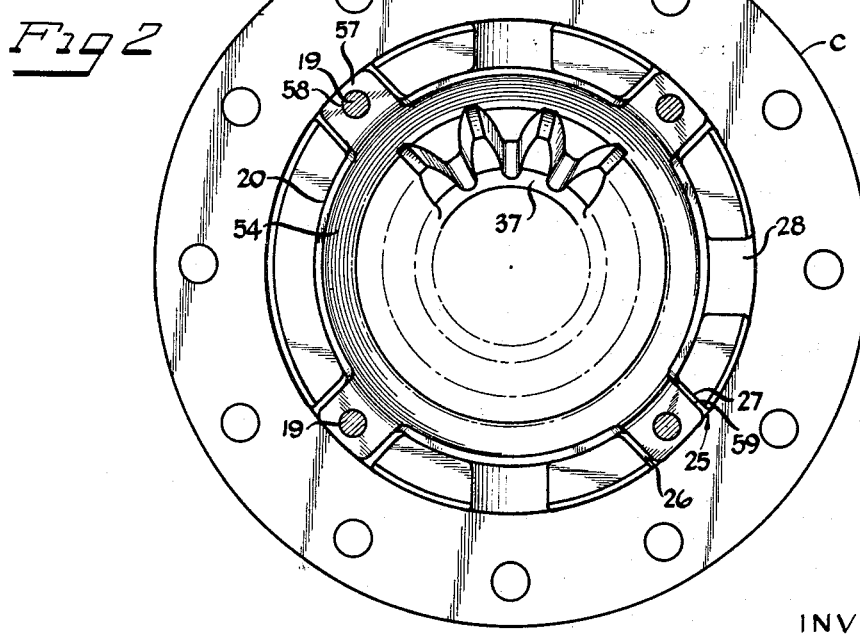
INVENTOR
WILLIAM G. JEAKLE

United States Patent Office 3,327,561
Patented June 27, 1967

3,327,561
DIFFERENTIAL MECHANISM
William G. Jeakle, Auburn, Ind., assignor to Borg-Warner Corporation, Chicago, Ill., a corporation of Illinois
Filed July 29, 1965, Ser. No. 475,812
4 Claims. (Cl. 74—711)

This invention relates to limited slip differential mechanisms which provide a predetermined resistance to differential action. More particularly, it relates to limited slip differential mechanisms which utilize conically shaped clutch members to provide the resistance to free differentiation.

It is the principal object of the present invention to provide an improved form of limited slip differential mechanism utilizing a conically shaped clutch to resist differentiation.

It is a further object of the present invention to provide an improved form of limited slip differential mechanism utilizing conically shaped clutches to resist differentiation wherein the machining of conically shaped cone seat surfaces on the interior of the mechanism casing is eliminated.

It is another object of the present invention to provide an improved form of limited slip differential mechanism of the type described which includes separate removable inserts which form the conically shaped cone seat surfaces.

It is a further object of the present invention to provide a limited slip differential mechanism having a differential casing comprised of separable halves and having removable cone seat inserts axially positioned with respect to the casing by upstanding drive tabs interposed between the casing halves and which are secured in driving engagement with the casing.

It is another object of the present invention to provide a removable cone seat insert for a limited slip differential mechanism.

These and other objects of the present invention will become apparent with reference to the following description and the accompanying drawings.

In the drawings:

FIGURE 1 is a revolved cross-sectional view of a differential mechanism constructed in accordance with the present invention showing various of the features thereof;

FIGURE 2 is an elevational view of a portion of the apparatus of FIGURE 1 showing various other of the features of the invention.

Referring now to the drawing, there is shown a differential mechanism generally designated D disposed in operative association with a pair of coaxially aligned relatively rotatable output shafts S. These shafts may form the driving axle of an automotive vehicle, or any other device which requires distribution of torque to two utilization points where relative movement between shafts is necessary under certain operating conditions.

The mechanism D includes a casing C surrounding adjacent ends of the output shafts S which casing is adapted to receive input torque from a drive line system (not shown). A bevel gear system generally designated G is connected between the casing C and the shafts S and transmits rotational effort to the shafts while simultaneously allowing relative rotation between them when required, as when an automotive vehicle negotiates a corner.

A pair of friction clutches F provide the desired resistance to differential action. Each clutch includes a friction surface associated with the casing C and a friction surface associated with one of the output shafts S. Frictional engagement of these surfaces provides a direct path for transmission of rotational effort from the casing to the output shafts independent the bevel gear system G.

The friction surfaces of the clutches F are maintained in engagement by a spring pack P which provides an initial preload directly upon the clutch members.

Each of the clutches F includes a removable insert I which is connected to the casing C for rotation therewith and which forms the friction surface of the clutch F associated with the casing C.

More particularly, the casing C is formed by a pair of cooperating, generally cup-shaped sections comprising a flange section 11 and a cap section 13 which include generally cylindrical wall portions 15 disposed in abutting relation along a parting line 17. These sections are retained in abutting relation as by bolts 19 with the exterior surface of the walls defining a portion of the exterior of the casing and the interior surface of the walls defining a longitudinally extending generally cylindrical pilot surface 20. The sections 11 and 13 further define a cavity 21 surrounding the adjacent ends of the output shafts S.

Each of the sections 11 and 13 includes a shaft opening defined by a longitudinally elongated hub 23 centrally disposed in a transverse wall 24 of that section which receives the shaft S. The hubs 23 do not journal the shafts S but rather support ball or roller bearings (not shown) which position the mechanism D within the axle assembly.

A plurality of slots 25 are provided which are formed by mating openings in the abutting ends of the casing sections. Each slot half, formed in one of the respective casing sections, includes a transverse wall 26. The distance between the walls 26 defines the axial width of the slot 25. Each slot further includes a pair of longitudinally directed walls 27 which define the circumferential width of the slot.

The slots 25 are positioned about the parting line 17 such that a case bolt 19 will pass through the center thereof as best seen in FIGURE 2 for purposes as will become apparent shortly.

These slots are adapted to receive portions of the inserts I in a manner as will be explained. In the illustrated embodiment, four such slots are shown, although the number may be varied as desired without departing from the scope of the invention.

A side port, such as the side port 28, may be provided to allow lubricant to enter the casing C for lubrication of the bevel gear system G and the clutches F.

The flange section 11 of the casing C includes a radially directed flange 29 extending about its exterior periphery to which is secured a ring gear (not shown) adapted to receive an input torque from the drive line system.

Referring now to the bevel gear system G, best seen in FIGURE 1, there is provided an arrangement which transmits output torque to the shafts S and simultaneously allows relative rotation between shafts when necessary.

The bevel gear system includes a pair of side gears 27, each of which is connected to one of the shafts S for rotational movement therewith and axial movement thereon. To effect this relationship between the shafts and side gears, the adjacent ends of the shafts S and the internal bore of the gears are splined.

The side gears are in constant mesh with a pair of pinion gears 39 supported by a transversely extending pinion pin 41 disposed intermediate the adjacent ends of the shaft S and secured to the casing C for rotation therewith by retainer pin 43.

As can be appreciated, rotation of the differential casing C by the drive line system causes the pinion pin 41 to revolve about the centerline of the shafts S. The pinion gears 39, therefore, transcribe a generally cylindrical path about the axis of the shafts, and as they are in mesh with the side gears 37, the side gears are caused to rotate and thereby transmit torsional effort to the output shafts S.

If one of the output shafts is required to rotate at a different speed from the other, as when cornering, the pinion gears 39 not only revolve about the longitudinal axis of the output shafts, but also rotate about the pinion pin 41 allowing relative movement between the side gears 37. Consequently, the output shafts S rotate relative to each other as well as relative to the casing C.

Differentiation, i.e., relative rotation between the shafts, inherently possible by virtue of the above described structure, is resisted by the engagement of the friction surfaces of the clutches F. Each of these clutches includes a frusto-conical clutch member 45 and one of the cone seat inserts I frictionally engaged by the member 45 along a complementary conical surface.

A spirally progressing groove 47 is provided in the conical surface of the clutch member 45 for distribution of oil or other lubricant to the frictionally engaged surfaces.

Each clutch member 45 includes an internally splined bore 51 connected to one of the shafts S and is, therefore, rotatable with the shaft and axially movable thereon.

Each of the clutch members 45 is disposed between one of the transverse walls 24 of the casing C and one of the side gears 37 and includes a generally radially directed annular face 52 in contact with adjacent side gears.

As stated, and as best seen in FIGURE 1, the conical drum or seat surfaces frictionally engaged by the clutch members 45 are provided by the removable cone seat inserts I which form the friction surfaces of the clutches F associated with the casing C.

These inserts include a generally conically shaped wall portion 53, the interior of which includes a conical seat surface 54 engaged by the clutch member 45. The inserts I may be formed of any suitable material such as, for example, steel, and may be made by any one of several manufacturing processes such as stamping, turning, spinning, grinding, etc. A plurality of tabs 55 are formed at the divergent end of the conical wall of each of the inserts I. In the illustrated embodiment, it is contemplated that four such tabs be provided which are spaced circumferentially in equal increments about the conical wall.

Each tab 55 includes a longitudinally extending portion 56 having an outer surface disposed in contact with the cylindrical surface 20 of the walls 15 of the casing C. The longitudinal portions 56 are appropriately formed so that this contact between the outer surfaces thereof and the cylindrical surface 20 of the casing C serves to radially position the inserts with respect to the casing.

The free ends of the longitudinal portions of the tabs 56 terminate in radially directed upstanding portions 57. The tabs of each one of the inserts are positioned within the slots 25 of the casing C in abutting relationship to the corresponding upstanding portions of the tabs of the other of the inserts I.

The thickness of the upstanding portion 55 is approximately equal to one-half of the distance between the transverse walls 26 of each slot so that with two upstanding portions positioned in each slot (i.e., one associated with each insert), the inserts are securely retained and positioned axially with respect to the casing C. Therefore, axial forces applied to the clutch members 35 by the spring pack P and bevel gear system G are effectively resisted by the inserts I through engagement of the upstanding portions 57 with the slots 25. The axial forces are then operative to provide frictional engagement between the inserts I and the clutch members 35.

To provide driving engagement between the casing C and the inserts I, an aperture 58 is provided in each of the upstanding portions 57 of the tabs 55.

Case bolts 19 pass through the apertures and provide the necessary driving engagement between these components essential to the transmission of rotational effort from the casing C to the shafts S through the clutches F. Of course, it would be possible to effect driving engagement between the inserts and the casing by contact of transverse ends 59 of the upstanding portions 58 of the tabs with the longitudinally spaced apart walls 27 of the slots 25. This arrangement would provide the necessary driving relationship and should be included as being within the contemplated scope of the invention.

Each insert I is provided with a plurality of lubricating orifices 63 to supply lubricant to the spirally progressing groove 47 of the clutch member 45. These orifices are disposed longitudinally along the insert conical wall 53 in one or more rows as desired. Lubricant from within the cavity 21 of the casing C may pass through these orifices into communication with the spiral grooves 47 for distribution to the frictionally engaged surfaces.

Application of the axial forces upon the clutch members 45 is accomplished in two ways; first, initial frictional engagement of the clutch members 45 with the drum or seat surfaces of the inserts I is provided by the spring pack P.

Secondly, frictional engagement is increased generally as a function of the torsional input to the mechanism casing C by the bevel gear system G.

Application of torque to the mechanism creates axial separating forces upon the side gears 37 which forces are, in turn, transferred to the clutch members 35 to provide a cumulative increased frictional engagement of the clutches to resist differential action.

The spring pack P which provides the above described initial preload upon the clutch members is disposed within the cavity 21 in generally surrounding relation to the pinion pin 41.

The spring pack P includes a pair of gear contacting members 65 each of which is in contact with one of the side gears 27 adjacent the pinion pin 41. Each of the gear contacting members includes axially extending flanges having openings 67 to provide clearance for the pinion pin 41. A plurality of compressed coil springs 69 extend longitudinally between the contacting members 65 and urge them axially outwardly. This axial loading is transmitted to the side gears which are axially movable on the shafts S. The side gears, in turn, transmit the axial force to the clutch members 35, which are also splined to the shafts S and consequently are free to move axially into frictional engagement with the conical friction surfaces on the inserts I.

As can be seen, a differential mechanism has been provided which utilizes cone seat inserts to form the conical clutch surfaces associated with the mechanism casing. The inserts include drive tabs which radially position the inserts within the mechanism and further include upstanding portions disposed in slots in the casing which axially position the inserts within the casing and provide a driving engagement therebetween.

Various of the features of the invention have been particularly shown and described, however, it should be obvious to one skilled in the art that various modifications

I claim:

1. A limited slip differential mechanism comprising: a differential casing adapted to receive an input torque for transmission to a pair of coaxially aligned, relatively rotatable output shafts, said casing including a wall of generally annular cross-section, means defining at least two circumferentially elongated slots extending through said annular wall in circumferentially spaced apart relation; at least one removable insert disposed internally of said casing, said insert including a generally conical wall defining a conical seat surface, at least two drive tabs secured to said conical wall at the divergent end thereof, each said tab including a generally longitudinally directed surface contacting the interior of said annular wall of said casing to radially position said insert, and a radially directed upstanding portion formed at the free end of said longitudinal portion disposed in one of said slots of said casing to axially position said insert and to effect a driving engagement between said insert and said casing; at least one conical clutch member disposed within said casing and adapted to be connected to one of the output shafts; biasing means urging said clutch member into a predetermined frictional engagement with said conical seat surfaces; and a bevel gear system including at least one pinion gear and at least one side gear within said casing adapted to be operatively connected to the output shafts for transmission of rotational effort thereto and to apply an axial force upon said clutch member in a direction to increase said frictional engagement.

2. A limited slip differential mechanism comprising: a differential casing adapted to receive an input torque for transmission to a pair of coaxially aligned, relatively rotatable output shafts, said casing including a wall of generally annular cross-section, the interior of which includes a longitudinally extending generally cylindrical surface, portions of said wall being formed by separable casing halves secured together along a generally transverse parting line, means defining at least two slots extending through said annular wall in circumferentially spaced apart relation, portions of each of said slots being formed in each of said casing halves with said portions being disposed in mating alignment at said parting line, said slots in each said casing half including a transverse wall defining with the transverse wall of said slot portion of the other casing half the longitudinal width of said slot; a pair of removable inserts disposed internally of said casing, each said insert including a generally conical wall defining a conical seat surface, said inserts being disposed in said casing with the divergent ends thereof in axially spaced apart facing relation, each said insert including at least two drive tabs secured to said conical wall at said divergent end, each said tab including a longitudinally directed surface in contact with said cylindrical surface of said casing to radially position said inserts and radially directed upstanding portion formed at the free end of said longitudinal portion disposed in one of said slots of said casing to axially position said inserts and to effect a driving engagement between said inserts and said casing; a pair of clutch members, each of which is adapted to frictionally engage one of said inserts disposed within said casing and adapted to be connected to one of the output shafts; biasing urging said clutch members into a predetermined frictional engagement with said conical seat surfaces; and a bevel gear system including at least one pinion gear and at least one side gear within said casing adapted to be operatively connected to the output shafts for transmission of rotational effort thereto and to apply an axial force upon said clutch members in a direction to increase said frictional engagement.

3. A limited slip differential mechanism comprising: a differential casing adapted to receive input torque for transmission of a pair of coaxially aligned, relatively rotatable output shafts, said casing including a wall of generally annular cross-section, the interior of which includes a longitudinally extending generally cylindrical surface, portions of said wall being formed by separable casing halves secured together along a generally transverse parting line, means defining a plurality of circumferentially elongated slots extending through said wall in circumferentially spaced apart relation at generally equal increments, portions of each of said slots being formed in each of said casing halves with said portions being disposed in mating alignment at said parting line, the portion of said slots in each said casing half including a transverse wall defining with the transverse wall of said slot portion of the other casing half the longitudinal width of said slot; a pair of removable inserts disposed internally of said casing, each said insert including a generally conical wall defining a conical seat surface, said inserts being disposed in said casing with the divergent ends thereof in axially spaced apart facing relation, each said insert including a plurality of drive tabs secured to said conical wall at said divergent end, each said tab including a longitudinally directed surface in contact with said cylindrical surface of said casing to radially position said inserts and radially directed upstanding portion formed at the free end of said longitudinal portion disposed in one of said slots of said casing to axially position said inserts and to effect a driving engagement between said inserts and said casing, said upstanding portion of said tabs of one of said inserts being disposed in lateral abutting relation to the upstanding portions of said tabs on the other of said inserts and the axial thickness of each upstanding portion being equal to approximately one-half of the distance between said transverse walls of said slots; a pair of clutch members, each of which is adapted to frictionally engage one of said inserts disposed within said casing and adapted to be connected to one of the output shafts; biasing means urging said clutch members into a predetermined frictional engagement with said conical seat surfaces; and a bevel gear system including at least one pinion gear and at least one side gear within said casing adapted to be operatively connected to the output shafts for transmission of rotational effort thereto and to apply an axial force upon said clutch members in a direction to increase said frictional engagement.

4. A limited slip differential mechanism comprising: a differential casing adapted to receive an input torque for transmission to a pair of coaxially aligned, relatively rotatable output shafts, said casing including a wall of generally annular cross-section, the interior of which includes a longitudinally extending generally cylindrical surface, portions of said wall being formed by separable casing halves, said casing including means securing said halves together, means defining a plurality of circumferentially elongated slots extending through said wall in circumferentially spaced apart relation at generally equal increments, portions of each of said slots being formed in each of said casing halves with said portions being disposed in mating alignment at said parting line, the portion of said slots in each said casing half including a transverse wall defining with the transverse wall of said slot portion of the other casing half the longitudinal width of said slot; a pair of removable inserts disposed internally of said casing, each said insert including a generally conical wall defining a conical seat surface, said inserts being disposed in said casing with the divergent ends thereof in axially spaced apart facing relation, each said insert including a plurality of drive tabs secured to said conical wall at said divergent end, each said tab including a longitudinally directed surface in contact with said cylindrical surface of said casing to radially position said inserts and a radially directed upstanding portion formed at the free end of said longitudinal portions disposed in one of said slots of said casing to axially position said insert, said upstanding portion further including means defining apertures therethrough and said means securing said casing halves together extending through said apertures to effect a driving engagement between said inserts and said casing, said upstanding portion of said tabs of one of said inserts being disposed in lateral abutting relation to the upstanding portions of said tabs of the other of said inserts and the axial thickness of each upstanding portion being equal to approximately one-half of the distance between said transverse walls of said slots; a pair of clutch members, each of which is adapted to frictionally engage one of said inserts disposed within said casing and adapted to be connected to one of the output shafts; biasing means urging said clutch members into a predetermined frictional engagement with said conical seat surface; and a bevel gear system including at least one pinion gear and at least one side gear within said casing adapted to be operatively connected to the output shafts for transmission of rotational effort thereto and to apply an axial force upon said clutch members in a direction to increase said frictional engagement.

References Cited

UNITED STATES PATENTS 3,186,258   6/1965   Meldola   74—710.5
3,224,299   12/1965   Holdeman et al.   74—711

FOREIGN PATENTS 1,236,299   6/1960   France.

FRED C. MATTERN, Jr., *Primary Examiner.*

J. A. WONG, *Assistant Examiner.*